United States Patent Office 3,072,461
Patented Jan. 8, 1963

3,072,461
PREPARATION OF PHOSPHORIC ACID
Ray S. Long and David A. Ellis, Concord, Calif., assignors to The Dow Chemical Company, Midland, Mich., a corporation of Delaware
No Drawing. Filed July 29, 1960, Ser. No. 46,104
5 Claims. (Cl. 23—165)

This invention relates to a method for the preparation of phosphoric acid and more particularly is concerned with a process for the production of phosphoric acid by hydrochloric acid acidulation of a tricalcium phosphate containing material followed by extraction of the phosphoric acid so-produced from the reaction solution into an organic, water-immiscible alkyl substituted phosphate and subsequently water stripping the acid from the organic extractant.

A principal object of the present invention is to provide a method for recovering substantially all of the $P_2O_5$ values, as relatively pure phoshoric acid, from a tricalcium phosphate containing material including rock phosphates and minerals or ores where tricalcium phosphate is associated with other compounds. It is a further object of the present invention to provide a method for the production of "wet-process" phosphoric acid in which the acidulation of the calcium phosphate rock is completed in a short period of time and in which there is eliminated the need for exhaustive pregrinding of the rock thereby reducing both equipment and operating costs. It is an additional object of the present invention to provide a new and novel method for economically producing phosphoric acid substantially free of interfering and contaminating ions, particularly fluoride, normally associated with "wet-process" phosphoric acid as produced by conventional methods.

A still further object of the present invention is to provide useful calcium chloride as a byproduct.

Other objects and advantages will become apparent from the detailed specification presented hereinafter.

In carrying out the process of the present invention, a tricalcium phosphate material is acidulated with aqueous hydrochloric acid, the resulting ortho phosphoric acid is extracted from the reaction solution by contacting the solution with a substantially water-immiscible trialkyl phosphate, and, the extracted phosphoric acid is stripped from the acid-laden organic extract by liquid-liquid extraction with water.

Phosphate containing materials suitable for use as a raw material in the method of the present invention are $Ca_3(PO_4)_2$ or any phosphate rock or ore approaching $Ca_3(PO_4)_2$ in composition. This process is also applicable to phosphate containing iron ores, such as $Fe_2O_3$-apatite mixed ore common to the Rocky Mountain States. Of particular utility are the naturally occurring phosphate ores, e.g., fluorapatite, chlorapatite, hydroxyapatite, carbapatite, land pebble, brown rock, amblygonite, monazite, variscite, fairfieldite, aluminum phosphate and mixed $AlPO_4$—$Ca_3(PO_4)_2$ "leached zone ore" and the like. Previous to the process of the instant invention, it was not possible to economically recover phosphate values from many of these by the conventional sulfuric acid leach process. For example, the "leached zone ore," although it is substantially soluble in the sulfuric acid, currently must be removed and discarded at great expense since the phosphoric acid and aluminum sulfate produced cannot be separated. This ore not only is readily soluble in concentrated hydrochloric acid but with this acid, ready recovery of the phosphoric acid is achieved.

No special preparation of the phosphate raw material is necessary in carrying out the method of this present invention. The reaction of the rock with the hydrochloric acid proceeds almost equally as rapidly with unground ore as with finely ground material.

Aqueous hydrochloric acid of from about 4 to about 8 molar in hydrogen chloride is used in acidulating the rock to leach the phosphate therefrom; a hydrochloric acid concentration of about 7 molar is preferred. Concentrations of hydrochloric acid below about 4 molar are not desired, for with such low concentration of ions the subsequent extraction of the phosphoric acid by the organic extractant is reduced, this extraction being favored by a high concentration of inorganic ions, e.g. $Ca++$, $Cl-$ and the like in the reaction solution. However, at concentrations of hydrochloric acid greater than about 8 molar, an undesirable calcium chlorophosphate forms.

In carrying out the acidulation of the phosphate material, the ratio of hydrochloric acid to phosphate $(H+/PO_4\equiv)$ to be used will range from 3/1 to about 3.3/1 on a molar basis as represented by the chemical equation: $Ca_3(PO_4)_2+6HCl=3CaCl_2+2H_3PO_4$. A large stoichiometric excess of hydrochloric acid is to be avoided since free hydrochloric acid can be co-extracted by the organic extractant along with the phosphoric acid product. A deficiency of acid results in low recovery.

The time of acidulation will be that time which is necessary to insure substantially complete dissolution of the phosphate. Ordinarily a reaction time of from about 5 minutes to about 1 hour is sufficient to give substantially complete dissolution of the calcium and phosphate present. Longer times may be employed if desired, although the undesirable dissolution of impurities, e.g. iron and fluoride, increases with extension of the acidulation contact time. An added advantage of this leaching is that the fluoride is confined to the residue.

The dilute phosphoric acid as produced is present in a mixture consisting of a solution which is either almost completely or is completely saturated with inorganic ions (for example calcium, chloride, iron, aluminum and the like) and an insoluble residue which contains substantially all of the fluoride which may be present in the ore. The phosphoric acid is removed from this reaction mixture by contacting the mixture or the filtrate with a substantially water-immiscible trialkyl phosphate. Useful organic extractants include those trialkyl substituted phosphates wherein the number of carbons of each of the individual alkyl groups ranges from 2 to about 8 or more. Preferably tributyl phosphate will be employed as the organic extractant. However, ethylpropylbutylphosphate, trioctylphosphate, trihexylphosphate, ethyldioctylphosphate, tripentylphosphate, and the like can be used. In carrying out the extraction, the aqueous reaction mixture will be treated with the trialkyl phosphate in a conventional liquid-liquid extraction apparatus, i.e. single or multiple stage mixer-settlers, countercurrent contactors and the like, at temperatures of from about 25° C. to about 10° C. or lower for a period of time of actual contact ranging from about 5 minutes to about 1 minute. The contact time will be selected so that substantially all of the phosphoric acid is extracted from the aqueous reaction mixture without simultaneous coextraction of appreciable amounts of the more slowly extractable calcium chloride. The ratio of organic extractant to aqueous reaction mixture will range from about 1:1 to about 5:1 or more with a preferred ratio being about 3:1. If desired, the trialkyl phosphate extractant as used can be carried in a substantially water-immiscible diluent, for example aromatic hydrocarbon, alkylaromatic hydrocarbon, aliphatic hydrocarbon and the like wherein the extractant concentration in the diluent will range from about 25 to about 75 percent of the total solution weight. Specific examples of useful diluent members are toluene, benzene, decane, mineral spirits, xylene, ethylbenzene, kerosene, mesitylene and the like.

The phosphoric acid is stripped from the trialkyl phosphate, after separating the acid laden organic extract and aqueous reaction phases, by contacting the trialkyl phosphate extract with water. Preferably demineralized water will be used in a multiple stage countercurrent extraction system to strip the phosphoric acid from the trialkyl phosphate utilizing conventional extraction and stripping techniques. A contact time between the stripping water and the organic phase will be a total time of about 10 minutes or less with a stripping time of about 5 minutes and preferably of less than one minute being utilized. The stripping temperature can be from 20 to about 100° C. with a preferred range being from about 60 to about 100° C. The phase ratio of water to extract is not critical, although in order to achieve maximum concentration of the phosphoric acid product in the water strip it is preferred that this will be maintained at the minimum value for substantially complete removal of the phosphoric acid from the organic phase. The phosphoric acid depleted trialkyl phosphate organic extractant can be separated from the aqueous phosphoric acid product and recycled for a subsequent extraction.

The phosphoric acid as produced is of good purity, being substantially fluorine free and containing only a small amount of calcium chloride as the main impurity. Alternatively, if desired, a phosphoric acid product of still higher purity, approximately food grade purity, can be prepared by scrubbing the phosphoric acid laden trialkyl phosphate with a small amount of phosphoric acid dissolved in water (about 15 to about 30 percent by weight acid concentration) prior to the water stripping procedure. A phase ratio of the phosphoric acid scrub solution to the organic extract of from about 0.1/1 to about 0.5/1 is used and the scrubbing operation is carried out at a temperature of from about 30 to about 100° and preferably at temperatures over a range of about 50° to about 100° C.

On the other hand, if the desired product is an impure, fertilizer-grade phosphate, the phosphate values can be conveniently recovered directly from the phosphate loaded organic extractant with aqueous ammonia. For example, with 33 percent aqueous ammonia, ammonium phosphate $(NH_4)_2HPO_4$, is precipitated and stripped into the aqueous phase. One preferred method of phosphate recovery would be to blow gaseous ammonia through the phosphoric acid loaded extractant. Utilization of this technique precipitates 80–90 percent of the phosphate present directly in the extractant, the remainder dissolving in the water produced during the neutralization. This product is easily separated from the aqueous solution by any one of a number of conventional techniques, e.g. settling, filtration, centrifuging, etc.

In the recovery of the phosphate values using the above described method, an excess of ammonia must be used. The excess insures efficiently accomplishing of the precipitation-stripping by suppressing solubility of the dibasic ammonium phosphate.

The following Examples will serve to further illustrate the process of the present invention but are not meant to limit it thereto.

*Example 1*

Florida phosphate land pebble rock (3,000 grams) was dissolved over about a 30 minute period of time in a mixture of about 4 liters of 12 molar hydrochloric acid and about 2.5 liters of water (equivalent to about 7.4 molar hydrochloric acid utilizing a molar ratio of acid to phosphate $(H+/PO_4\equiv)$ of about 3.3 to 1 on a molar basis. The resulting mixture contained a small amount of an insoluble residue which was removed from the solution by filtration. Analysis of this residue indicated that it contained substantially all of the fluoride originally present in the ore. The filtrate was analyzed for phosphate, chloride and calcium and acid content. These constituents were found to be present in amounts shown as follows: phosphate $(PO_4\equiv)$—16 percent, chloride—24 percent, calcium—12 percent, strong acid concentration—2.4 molar and weak acid concentration—3.2 molar. The filtrate was passed through a laboratory scale continuous four-stage mixer-settler apparatus at about 20° C. at a flow rate of about 11 cubic centimeters per minute. Simultaneously a 50 percent solution of tributyl phosphate dissolved in toluene also at about 20° C. was passed through the apparatus at a flow rate of about 29 milliliters per minute. Subsequently, the phosphoric acid-laden organic extract was separated from the reaction mixture and was contacted with a small amount of phosphoric acid laden aqueous strip solution (3.4 milliliters per minute) in a single stage scrubbing operation. Following the phosphoric acid scrub, the organic acid laden extract was contacted with demineralized water in a four-stage mixer-separator apparatus at a flow rate of about 5 cubic centimeters per minute. The resulting aqueous phosphoric acid product was analyzed and found to contain about 24 percent phosphate, 5.6 percent chloride and was substantially calcium free. The strong acid concentration was about 3.8 molar and the weak acid concentration was about 2.5 molar.

*Example 2*

Utilizing the same experimental technique and apparatus as in Example 1 but eliminating the intermediate phosphoric acid scrubbing step, 2,000 grams of the phosphate ore were dissolved in a mixture of about 3 liters of 12 molar hydrochloric acid and about 1.8 liters water. After dissolution of the ore in the acid the material was filtered to remove the small amount of insoluble residue which remained and the filtrate (feed to the extraction apparatus) was analyzed. The phosphate, chloride and calcium content as well as acid content of the filtrate are shown as follows: phosphate—16.8 percent, chloride—24.7 percent, calcium—12.6 percent, strong acid—2.4 molar and weak acid—3.2 molar. Tributyl phosphate, without a diluent, was utilized as the extractant in the present experiment and demineralized water again was used as the stripping agent. Four stages of extraction and four stages of stripping were used. Flow rates through the mixer-separator of the dilute phosphoric acid feed, tributyl phosphate extractant, and demineralized water strip, were 7.1, 8.9, and 3.2 cubic centimeters per minute respectively. The aqueous phosphoric acid product was analyzed and found to contain about 21.5 percent phosphate, 8.1 percent chloride and about 2.8 percent calcium. The strong acid concentration was found to be 3.15 molar and the weak acid about 2.7 molar.

In a manner similar to that defined for the foregoing examples, fluorapatite can be acidulated with substantially a stoichiometric molar quantity of about 4 molar hydrochloric acid, the acidulated mixture can be filtered and the filtrate treated with trioctyl phosphate at an aqueous phase/organic phase ratio of about 1 to 1. The phosphoric acid laden trioctyl phosphate then can be separated from the aqueous phase and this organic phase scrubbed with about a 15 percent solution of phosphoric acid at a phosphoric acid/organic phase ratio of about 0.5 to 1 at a temperature of about 95° C. The scrubbed organic phase then can be contacted with water at about 60° C. in a mixer settler, the total time of contact being about 1 minute, and the temperature of the contacting water being about 75° C. The aqueous phosphoric acid solution resulting therefrom then can be separated from the trioctyl phosphate organic phase.

Ground rock phosphate ore can be acidulated with about a stoichiometric molar quantity of 7 molar hydrochloric acid and the resulting product reaction mixture filtered. The filtrate may be treated with triethyl phosphate at an organic to aqueous phase ratio of about 5 to 1. The organic phosphoric acid loaded organic triethyl phosphate extract, after separation from the aqueous acidulation mixture, can be scrubbed with about 30 percent phosphoric acid at a phase ratio of about 0.1 to 1 (phosphoric acid to organic phase) at a temperature of about 30° C. The scrubbed organic phosphoric acid laden extract then can be extracted with water at about 20° C. and the aqueous phosphoric acid so produced then be separated from the phosphoric acid depleted triethyl phosphate.

Various modifications can be made in the process of the present invention without departing from the spirit or scope thereof for it is understood that we limit ourselves only as defined in the appended claims.

We claim:

1. A process for the production of phosphoric acid which comprises; acidulating a phosphate containing ore with aqueous hydrochloric acid solution said acid being from about 5 to 7 molar in concentration and the hydrogen ion to phosphate ratio of said acid and said ore being from stoichiometric (3 to 1) to about 3.3 to 1 on a molar basis, contacting the reaction mixture of the acidulation with a substantially water-immiscible trialkyl phosphate organic extractant thereby extracting said phosphoric acid from said reaction mixture, the number of carbon atoms of each alkyl substituent of said trialkyl phosphate being from 2 to up to 8, separating the phosphoric acid laden organic extract from the substantially phosphoric acid depleted reaction mixture, scrubbing said phosphoric acid laden extract with an aqueous phosphoric acid solution said aqueous phosphoric acid solution being of a concentration of from about 15 to about 30 percent in phosphoric acid content and the phase ratio of said aqueous phosphoric acid to said organic extract being from about 0.1 to 1 to about 0.5 to 1, contacting said scrubbed phosphoric acid laden organic extract with water, and separating the aqueous phosphoric acid solution so produced from said phosphoric acid depleted organic extractant.

2. The process as defined in claim 1 wherein the acidulation of the ore is carried out over a period of from about 5 minutes to about one hour, the acidulation reaction mixture is contacted with the trialkyl phosphate organic extractant for a period of time ranging from about 5 minutes to about 1 minute at a temperature of about 25° C., the scrubbing of the phosphoric laden extract is carried out at a temperature of from about 50° C. to about 100° C. and the phosphoric acid is stripped from the organic extract with the water using an actual contact time of about 1 minute and a temperature of from about 60 to about 100° C.

3. The process as defined in claim 1 wherein said trialkyl phosphate organic extractant is tributyl phosphate.

4. The process as defined in claim 1 wherein said aqueous hydrochloric acid acidulating material is about 7 molar in concentration.

5. A process for the production of phosphoric acid which comprises; acidulating over a period of from about 5 minutes to about one hour a phosphate containing ore with aqueous hydrochloric acid solution, said acid solution being from about 4 to about 8 molar in hydrogen chloride concentration, said acid and ore being utilized at a hydrogen to phosphate ratio of from stoichiometric (3 to 1) to about 3.3 to 1 on a molar basis, contacting for a period of time ranging from about 5 minutes to about 1 minute at a temperature of from about 25° C. to about 15° C. the acidulation reaction mixture with a substantially water-immiscible trialkyl phosphate organic extractant wherein the number of carbon atoms of each alkyl substituent of said trialkyl phosphate organic extractant is from 2 to about 8 thereby extracting said phosphoric acid from said reaction mixture, separating the phosphoric acid laden organic extract from the substantially phosphoric acid depleted reaction mixture, stripping said phosphoric acid from said organic extract with water at a water-extract contact time of about 5 minutes and a temperature of from about 20 to about 100° C., and separating the aqueous phosphoric acid solution so produced from said organic extractant.

References Cited in the file of this patent

UNITED STATES PATENTS

| | | |
|---|---|---|
| 1,929,442 | Milligan | Oct. 10, 1933 |
| 2,860,031 | Grinstead | Nov. 11, 1958 |
| 2,880,063 | Banill et al. | Mar. 31, 1959 |